No. 831,312. PATENTED SEPT. 18, 1906.
A. STUCKI.
SIDE BEARING FOR RAILWAY CARS.
APPLICATION FILED SEPT. 26, 1905.
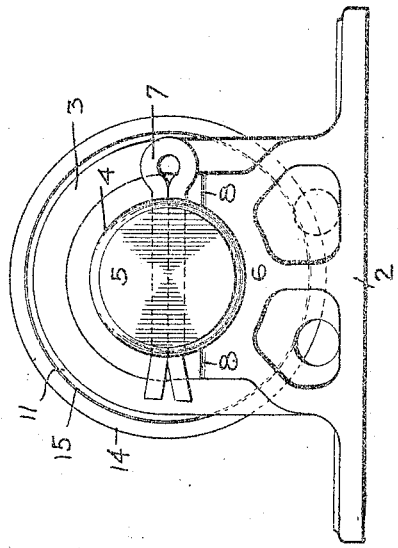
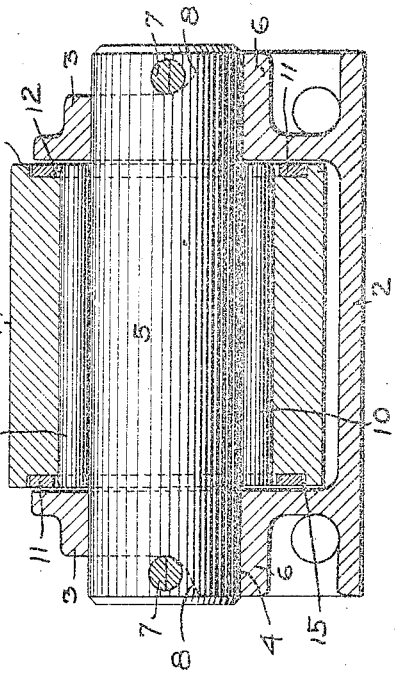
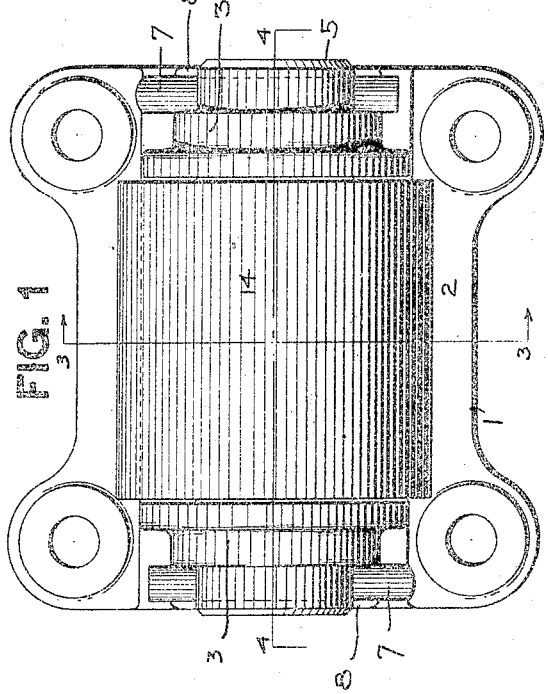
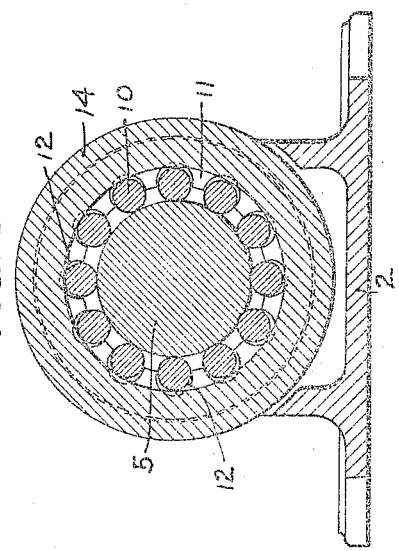
WITNESSES.
INVENTOR.

UNITED STATES PATENT OFFICE.

ARNOLD STUCKI, OF ALLEGHENY, PENNSYLVANIA.

SIDE BEARING FOR RAILWAY-CARS.

No. 831,312.

Specification of Letters Patent.

Patented Sept. 18, 1906.

Application filed September 26, 1905. Serial No. 280,204.

*To all whom it may concern:*

Be it known that I, ARNOLD STUCKI, a resident of Allegheny, in the county of Allegheny and State of Pennsylvania, have invented a new and useful Improvement in Side Bearings for Railway-Cars; and I do hereby declare the following to be a full, clear, and exact description thereof.

This invention relates to side bearings for railway-cars, such as are used either on the truck-bolsters or body-bolsters, and especially to side bearings of the frictionless type.

The object of the invention is to provide a side bearing which is constructed in a compact manner and so that no friction will take place, due to relative movement between the truck and car-body.

Another object is to provide a side bearing of this type which always presents a frictionless surface for the contact of the other member of the car no matter to what extent the bearing may have been rotated.

To the accomplishment of the aforesaid objects the invention consists of a side bearing provided with antifriction-rollers and arranged in the manner hereinafter described and claimed.

In the accompanying drawings, Figure 1 is a plan view of the bearing. Fig. 2 is an end view of the same. Fig. 3 is a cross-section on the line 3 3, Fig. 1; and Fig. 4 is a vertical longitudinal section on the line 4 4, Fig. 1.

The bearing comprises a suitable housing or support 1, provided with a base 2 for securing to the truck or body bolster, as the case may be, and having rising from the base the bearing-standards 3, which are provided with openings 4 for receiving an axle 5. The standards are widened out at the openings 4 on the side which takes the strain or thrust, as shown at 6, this giving a strong wide resisting-bearing for the axle 5. The axle is held against endwise displacement by means of suitable pins 7, such as spring cotter-pins, driven through openings in the ends of the axle outside of the bearings 3. The ends of these pins project beyond the axle and are in position to contact with the shoulder 8, formed by the edge of the projecting bearing 6. As a consequence the axle is not only held against endwise displacement, but also against rotation, so that no wear between the axle and its bearings can take place.

Surrounding the axle are a series of antifriction-rollers 10, which contact with the axle in the well-known manner to reduce friction. These rollers are held spaced apart equal distances, so as to prevent their bunching and creating friction one on the other, by means of suitable spacing-rings 11, which have notched or cut-out portions 12 on their inner edges which embrace the ends of the rollers. The rollers and spacing-rings are held between the side bearings or standards 3, and therefore are prevented from becoming displaced.

If desired, the car-body or truck, as the case may be, may contact directly with the rollers 10. I prefer, however, to surround these rollers by means of a sleeve or hollow cylinder 14, which runs loosely on the rollers. This sleeve or cylinder is recessed at its ends, as at 15, to receive the spacing-rings 11.

The side bearing described is simple of construction, compact, and strong. The bearing or contact face thereof is cylindrical, and therefore is always in proper position no matter to what extent it may have been turned or rotated. In action the sleeve 14 will merely run around loosely on the rollers 10, the latter in turn running around on the stationary axle 5. As a consequence the side bearing is practically frictionless and also practically free from wear.

It is obvious that this bearing may be used either on the truck or on the car-body with equally good results. It is also obvious that variations can be made in the proportion and arrangement of parts without departing from the spirit of the invention. While I prefer to use the sleeve 14, this is not absolutely necessary, as the rollers themselves could be made of sufficient diameter to project beyond the bearings or housings, so that the other member of the car can contact directly therewith or the shoe of the matching side bearing could be made sufficiently narrow to pass down between the bearings and contact with the rollers. It would also be possible to use a number of short sleeves in place of the one long sleeve shown.

What I claim is—

1. A side bearing for railway-cars comprising a base or bearing, an axle mounted therein and held against rotation, a series of rollers surrounding said axle and contacting therewith and having unreduced end portions, spacing-rings surrounding the ends of said rollers and provided with recesses on their inner edges which embrace said rollers, and a sleeve surrounding said rollers.

2. A side bearing for railway-cars comprising a suitable base or bearing providing standards or side walls, an axle mounted in said standards and held against rotation, rollers surrounding said axle and contacting therewith and having unreduced end portions, spacing-rings surrounding the ends of the rollers and provided with recesses on their inner edges which embrace said rollers, said rollers and spacing-rings being confined between the standards of the bearing, and a sleeve surrounding said rollers.

3. A side bearing for railway-cars comprising a base provided with standards having openings therein, an axle mounted in said openings, the walls at said openings on the thrust side being broadened, a pin passing through said axle with its ends projecting beyond the same to contact with said broadened bearing, a series of rollers surrounding said axle and contacting therewith, a sleeve surrounding said rollers and provided with recessed ends, and spacing-rings seated in said recessed ends and embracing the ends of said rollers.

4. A side bearing for railway-cars comprising a base, standards rising therefrom and provided with openings, said standards being broadened or widened at the thrust side of the openings, an axle mounted in said openings, a pin passing through said axle and having an end in position to contact with the broadened bearing, a series of rollers surrounding said axle, a spacing member for keeping said rollers from contacting with each other, and a sleeve surrounding said rollers.

In testimony whereof I, the said ARNOLD STUCKI, have hereunto set my hand.

ARNOLD STUCKI.

Witnesses:
ROBERT C. TOTTEN,
G. C. RAYMOND.